(12) United States Patent
Berggren et al.

(10) Patent No.: US 10,516,505 B2
(45) Date of Patent: Dec. 24, 2019

(54) BASEBAND PROCESSORS, BASE STATION, USER DEVICE, AND METHODS THEREOF

(71) Applicant: Huawei Technologies Co., Ltd., Shenzhen, Guangdong (CN)

(72) Inventors: Fredrik Berggren, Kista (SE); Alberto Giuseppe Perotti, Segrate (IT)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 96 days.

(21) Appl. No.: 15/866,275

(22) Filed: Jan. 9, 2018

(65) Prior Publication Data
US 2018/0131474 A1 May 10, 2018

Related U.S. Application Data

(63) Continuation of application No. PCT/EP2015/065815, filed on Jul. 10, 2015.

(51) Int. Cl.
*H04L 1/18* (2006.01)
*H04L 1/16* (2006.01)
*H04L 1/00* (2006.01)

(52) U.S. Cl.
CPC ........... *H04L 1/1812* (2013.01); *H04L 1/004* (2013.01); *H04L 1/1614* (2013.01); *H04L 1/1671* (2013.01); *H04L 1/1861* (2013.01)

(58) Field of Classification Search
CPC .................................................... H04L 1/1812
(Continued)

(56) References Cited

U.S. PATENT DOCUMENTS 8,516,323 B2 * 8/2013 Raith ............... H04L 1/0017
714/708
2005/0100102 A1 * 5/2005 Gazdzinski .......... H04B 1/7163
375/242
(Continued)

FOREIGN PATENT DOCUMENTS

CN 102577209 A 7/2012
CN 103095437 A 5/2013
(Continued)

OTHER PUBLICATIONS

Machine Translation and Abstract of Chinese Publication No. CN103095437, May 8, 2013, 18 pages.
(Continued)

*Primary Examiner* — Fritz Alphonse
(74) *Attorney, Agent, or Firm* — Conley Rose, P.C.

(57) ABSTRACT

The present application relates to a baseband processor, comprising a receiver circuit configured to receive a downlink carrier aggregation transmission, wherein the baseband processor further comprises an encoder configured to generate a Cyclic Redundancy Check (CRC) code word based on at least one Hybrid Automatic Repeat Request-Acknowledgment (HARQ-ACK) feedback bit in response to the downlink carrier aggregation transmission, jointly encode at least one radio network parameter (P) of a user device with the CRC code word, and generate an uplink control information message (M) comprising the at least one HARQ-ACK feedback bit and the jointly encoded radio network parameter and CRC code word. Furthermore, the present application also relates to corresponding methods, a wireless communication system, a computer program, and a computer program product.

20 Claims, 7 Drawing Sheets

(58) Field of Classification Search
USPC .................................. 714/748, 749, 752, 747
See application file for complete search history.

(56) References Cited

U.S. PATENT DOCUMENTS

| | | | |
|---|---|---|---|
| 2006/0209970 A1* | 9/2006 | Kanterakis | H04L 1/0003 375/259 |
| 2009/0109884 A1 | 4/2009 | Kwon et al. | |
| 2010/0165931 A1* | 7/2010 | Nimbalker | H04L 1/0028 370/329 |
| 2013/0117622 A1 | 5/2013 | Blankenship et al. | |
| 2017/0332377 A1* | 11/2017 | Tseng | H04W 24/00 |
| 2018/0302896 A1 | 10/2018 | Nayeb Nazar et al. | |

FOREIGN PATENT DOCUMENTS

| | | |
|---|---|---|
| CN | 104067609 A | 9/2014 |
| CN | 104662956 A | 5/2015 |
| GB | 2502332 B | 11/2014 |

OTHER PUBLICATIONS

Machine Translation and Abstract of Chinese Publication No. CN104067609, Sep. 24, 2014, 25 pages.
Machine Translation and Abstract of Chinese Publication No. CN104662956, May 27, 2015, 33 pages.
Foreign Communication From a Counterpart Application, Chinese Application No. 201580081511.3, Chinese Office Action dated Jun. 27, 2019, 10 pages.

* cited by examiner

BASEBAND PROCESSORS, BASE STATION, USER DEVICE, AND METHODS THEREOF

CROSS-REFERENCE TO RELATED APPLICATIONS

This application is a continuation of International Application No. PCT/EP2015/065815, filed on Jul. 10, 2015, which is hereby incorporated by reference in its entirety.

TECHNICAL FIELD

The present application relates to baseband processors, a base station, and a user device. Furthermore, the present application also relates to corresponding methods, a wireless communication system, a computer program, and a computer program product.

BACKGROUND

Downlink carrier aggregation is a bandwidth expansion method used to increase the data rate for a user by allowing the user to receive data simultaneously on multiple carriers. High throughput can be obtained by utilizing adaptive coding and modulation while taking into account reported Channel State Information (CSI) reports into the scheduling operation, when combined with Hybrid Automatic Repeat reQuest (HARQ) feedback signaling in the uplink. The Uplink Control Information (UCI) signaling, e.g., HARQ Acknowledgement (HARQ-ACK), periodic CSI, aperiodic CSI, Scheduling Request (SR), constitutes uplink overhead which typically scales with the number of aggregated carriers. It is a non-trivial task to design the UCI feedback mechanisms, as reducing the amount of UCI information improves the reliability of the UCI and the coverage of the uplink (i.e., lower coding rates can be used) but may on the other hand adversely result in worse downlink throughput performance, i.e., if less HARQ-ACKs or CSI reports become available at base station (e.g., the E-UTRAN NodeB or evolved NodeB (eNodeB)).

As more frequency bands become available for the operators (e.g., using unlicensed spectrum also for cellular systems) and with a continued development of the device capabilities, the number of aggregated downlink carriers is expected to significantly increase in the future. On the other hand, it is considerably more expensive and complicated to produce devices capable of uplink carrier aggregation. Hence, a typical case is where the device can receive on multiple downlink carriers but is only able to transmit the UCI feedback on a single uplink carrier. Therefore, the UCI feedback mechanism may become a bottleneck if it requires transmission on a large number of uplink time-frequency resources. It is thus desirable to avoid feeding back UCI which provides no meaningful information to the eNodeB. One particular such example is HARQ-ACK information related to a carrier which is not scheduled, for which the device feeds back a Negative ACK (NACK), which may be disregarded at the base station since it knows on which carriers data was scheduled.

A further issue when increasing the number of aggregated downlink carriers is an increase in uplink intra-cell interference. Typically, the device is detecting a downlink control channel for each aggregated carrier, which provides information necessary for detecting the downlink data channel. An error case happens when the device detects a downlink control channel which is aimed for another device, or if it detects a downlink control channel although the eNodeB never transmitted any. These false detection events will result in that the device will try to detect the data channel and initiate a HARQ-ACK transmission and feed back a Negative ACK (NACK), since the associated data channel either was not transmitted or cannot be successfully detected. The device will therefore use uplink channel resources for UCI feedback which the eNodeB either does not expect to be used or it expects them to be used by another User Equipment (UE), thereby creating unexpected uplink intra-cell interference.

Therefore in order to accommodate systems with aggregation of large number of downlink carriers, it needs to be assured that feedback of unnecessary UCI information is reduced, while maintaining a high reliability of the decoded UCI at the eNodeB.

The 3GPP Long Term Evolution Advanced (LTE-Advanced) system is capable of downlink carrier aggregation between Frequency Division Duplex (FDD) carriers, between Time Division Duplex (TDD) carriers and between mixtures of FDD and TDD carriers. This system has supported carrier aggregation of up to 5 downlink carriers until Rel-12 and will be enhanced to support up to 32 downlink carriers in Rel-13 (1 Primary serving cell (PCell) and 31 Secondary serving cells (SCells)). Each transport block (TB) on the Physical Downlink Shared Channel (PDSCH) is associated with one HARQ-ACK bit, and at most 2 TBs can be transmitted on a carrier in a subframe. This could potentially yield 64 HARQ-ACK bits when the PCell is FDD and 618 bits when the PCell is TDD. The HARQ-ACK bits can be transmitted in the Physical Uplink Control Channel (PUCCH) or in the Physical Uplink Shared Channel (PUSCH). Different type of block codes and repetition codes are used for the HARQ-ACK, depending on the number of bits.

For FDD, each downlink subframe is associated with a corresponding uplink subframe used for transmitting the HARQ-ACK. For TDD, a set of downlink subframes is associated with an uplink subframe, wherein the HARQ-ACKs are transmitted. In each downlink subframe with a downlink assignment signaled on the downlink control channel (Physical Downlink Control Channel (PDCCH)/Enhanced PDCCH (EPDCCH)), the downlink control channel contains a two bit incremental counter, the Downlink Assignment Index (DAI), which is incremented for each subframe that has been scheduled among the set of downlink subframes. Furthermore, in TDD, uplink grants for the PUSCH signaled on the downlink control channel contain a two bit value, the uplink DAI, which indicates the total number of subframes which have been scheduled among the downlink subframes.

The number of HARQ-ACK feedback bits is semi-statically configured (by RRC signaling) and depends on the number of configured carriers, the transmission mode and, for TDD, the UL/DL configuration. A consequence is therefore that the UE will feedback a NACK if it was not scheduled in a given subframe, which will induce unnecessary overhead. In order to reduce the uplink overhead (i.e., the number of occupied resource elements), it was suggested to dynamically adjust the number of HARQ-ACK bits based on the actual number of scheduled carriers. This requires dynamic signaling from the eNodeB to the UE of the number of HARQ-ACK bits to be fed back. Dynamic signaling by means of physical control channels is faster but less reliable than RRC signaling. It is therefore an issue if the signaling is not detected correctly, causing the UE and the eNodeB to assume different number and/or order of the HARQ-ACK bits. The consequence maybe severe since that will generate significant amount of ACK-to-NACK and NACK-to-ACK errors of the HARQ-ACK bits.

SUMMARY

An objective of embodiments of the present application is to provide a solution which mitigates or solves the drawbacks and problems of conventional solutions.

An "or" in this description and the corresponding claims is to be understood as a mathematical OR which covers "and" and "or", and is not to be understood as an XOR (exclusive OR).

The indefinite article "a" in this disclosure and claims is not limited to "one" and can also be understood as "one or more", i.e., plural.

The above objectives and further objectives are solved by the subject matter of the independent claims. Further advantageous implementation forms of the present application can be found in the dependent claims.

According to a first aspect of the application, the above mentioned and other objectives are achieved with a baseband processor, comprising a receiver circuit configured to receive a downlink carrier aggregation transmission, wherein the baseband processor further comprises an encoder configured to generate a Cyclic Redundancy Check, CRC, code word based on at least one Hybrid Automatic Repeat Request-Acknowledgment, HARQ-ACK, feedback bit in response to the downlink carrier aggregation transmission, jointly encode at least one radio network parameter of a user device with the CRC code word, and generate an uplink control information message (M) comprising the at least one HARQ-ACK feedback bit and the jointly encoded radio network parameter and CRC code word.

The baseband processor may be located in a user device. Further, the receiver circuit is also known as a receiver.

At least one HARQ-ACK, feedback bit can mean "one or more HARQ-ACK feedback bits" implying one HARQ-ACK feedback bit or a plurality of HARQ-ACK feedback bits. However, the CRC code word may also be generated based on further bits, such as a SR bit or any other relevant information bit(s).

A radio network parameter could be an information entity related to information other than user data, which the transmitter feeds back to the receiver. The radio network parameter could be determined by the transmitter. The radio network parameter could comprise information which the base station has configured for the user device, e.g., the user device identity. The radio network parameter could comprise information which the user device is dynamically determining, e.g., a SR. The radio network parameter could comprise uplink control information which the user device is determining dynamically, e.g., the number of and the arrangement of the HARQ-ACK bits.

The baseband processor according to the first aspect makes it possible reduce the HARQ-ACK overhead by allowing the number of HARQ-ACK bits to be adapted dynamically, while guaranteeing with high probability that the base station and the UE have the same understanding of the number of and the arrangement of the HARQ-ACK bits. The baseband processor according to the first aspect also improves the HARQ-ACK reliability by providing the base station with the identity of the user device transmitting the HARQ-ACK bits. The baseband processor according to the first aspect also improves the HARQ-ACK reliability by avoiding encoding the SR bit together with the HARQ-ACK bits, and instead encodes the SR bit jointly with the CRC code word.

The baseband processor according to the first aspect also aims to improve the reliability of the UCI feedback by utilizing a CRC code word attached to information comprising at least one HARQ-ACK bit. A CRC code provides means for error detection at the receiver. It is realized that the probability of an erroneous CRC condition (i.e., a CRC pass) after erroneous decoding of the associated data bits is typically small. Therefore, either UCI information, or information associated with the UCI information can be encoded and contained in the CRC. This avoids increasing the number of bits carrying the UCI compared to the traditional way of information encoding, wherein the CRC does not comprise any information.

In a first possible implementation form of a baseband processor according to the first aspect, the radio network parameter indicates an identity of the user device.

An advantage of this possible implementation form is that the base station can reduce the effect of uplink control channel intra-cell interference by increasing the probability of decoding only HARQ-ACK bits from the desired user device.

The identity of the user device can, e.g., be a Radio Network Temporary Identifier (RNTI) or a Cell RNTI (C-RNTI).

In a second possible implementation form of a baseband processor according to the first possible implementation form of the first aspect or to the first aspect as such, the radio network parameter indicates one or more of: the number of the HARQ-ACK feedback bits and an arrangement of the at least one HARQ-ACK feedback bit in the control information message.

Advantages of this possible implementation form include an increased reliability of the HARQ-ACK signalling and improved spectral efficiency while allowing control overhead savings in the uplink, since NACK-to-ACK and ACK-to-NACK errors can be reduced.

In a third possible implementation form of a baseband processor according to the second possible implementation form of the first aspect, the radio network parameter further indicates one or more of: a downlink carrier, a downlink carrier group, a subframe, and a transport block, for which the at least one HARQ-ACK feedback bit is transmitted.

Advantages of this possible implementation form include an increased reliability of the HARQ-ACK signalling and improved spectral efficiency while allowing control overhead savings in the uplink, since NACK-to-ACK and ACK-to-NACK errors can be reduced.

In a fourth possible implementation form of a baseband processor according to the second possible implementation form of the first aspect, the radio network parameter is represented as a binary code word and wherein each bit in the binary code word indicates the one or more of: a downlink carrier, a downlink carrier group, a subframe, and a transport block, for which the at least one HARQ-ACK feedback bit is transmitted.

Advantages of this possible implementation form include an increased reliability of the HARQ-ACK signalling and improved spectral efficiency while allowing control overhead savings in the uplink, since NACK-to-ACK and ACK-to-NACK errors can be reduced.

In a fifth possible implementation form of a baseband processor according to any of the second to fourth possible implementation forms of the first aspect, the radio network parameter further indicates an index value transmitted in a downlink control channel for determining the number of the HARQ-ACK feedback bits and the arrangement of the at least one HARQ-ACK feedback bit.

Advantages of this possible implementation form include an increased reliability of the HARQ-ACK signalling and improved spectral efficiency while allowing control overhead savings in the uplink, since NACK-to-ACK and ACK-to-NACK errors can be reduced.

The index value could be derived from one or several bits in the downlink control channel, where each index value represents a number of HARQ-ACK bits and/or the arrangement of the HARQ-ACK bits.

In a sixth possible implementation form of a baseband processor according to any of the preceding possible implementation forms of the first aspect or to the first aspect as such, the radio network parameter indicates a Scheduling Request, SR.

Advantages of this possible implementation form include better detection performance by avoiding to allocate an explicit bit for the SR and simpler decoder implementation when the SR is multiplexed with multiple types of uplink control channel information, e.g., HARQ-ACK and periodic CSI or HARQ-ACK and aperiodic CSI.

In a seventh possible implementation form of a baseband processor according to any of the preceding possible implementation forms of the first aspect or to the first aspect as such, the CRC code word comprises one or more CRC bits and the radio network parameter is represented as a binary code word, and wherein the encoder further is configured to jointly encode the radio network parameter and the CRC code word by bit-wise addition of the one or more CRC bits with the binary code word.

An advantage of this possible implementation form is a simplified decoding procedure since the bit-wise addition comprises a linear operation which can be efficiently reverted at the receiver.

In an eighth possible implementation form of a baseband processor according to the seventh possible implementation form of the first aspect, the radio network parameter is represented as a binary code word according to one of a block code and a non-linear code.

An advantage with the block code is that the decoding complexity of the radio network parameter can be low.

An advantage of a non-linear code is that the codewords could be selected to maximize the minimum distance for a certain codeword to the other codewords.

In a ninth possible implementation form of a baseband processor according to the eighth possible implementation form of the first aspect, the minimum Hamming distance between code words of the non-linear code is different for different binary code words.

An advantage of this is that unequal error protection could be facilitated for different radio network parameters.

According to a second aspect of the application, the above mentioned and other objectives are achieved with a user device in a wireless communication system, wherein the user device comprises the baseband processor according to any one of the implementation forms according to the first aspect or to the first aspect as such, and further comprises a transmitter circuit configured to     transmit the uplink control information message in an uplink channel.

The advantages of the user device according to the second aspect are the same as for the baseband processor according to the first aspect.

According to a third aspect of the application, the above mentioned and other objectives are achieved with a baseband processor, comprising:

a receiver circuit configured to receive an uplink control information message in an uplink channel, the uplink control information message comprising at least one HARQ-ACK feedback bit in response to a downlink carrier aggregation transmission and at least one jointly encoded radio network parameter and CRC code word for a user device, wherein the CRC code word is based on the at least one HARQ-ACK feedback bit; and     a decoder configured to         decode the received uplink control information message and output the at least one HARQ-ACK feedback bit and the radio network parameter if a correct CRC condition is met.

The baseband processor according to the third aspect makes it possible reduce the HARQ-ACK overhead by allowing the number of HARQ-ACK bits to be adapted dynamically, while guaranteeing with high probability that the base station and the UE have the same understanding of the number of and the arrangement of the HARQ-ACK bits. The baseband processor according to the third aspect also improves the HARQ-ACK reliability by providing the base station with the identity of the user device transmitting the HARQ-ACK bits. The baseband processor according to the third aspect also improves the HARQ-ACK reliability by avoiding encoding the SR bit together with the HARQ-ACK bits, and instead encodes the SR bit jointly with the CRC code word.

The baseband processor according to the third aspect also aims to improve the reliability of the UCI feedback by utilizing a CRC code word attached to information comprising at least one HARQ-ACK bit. A CRC code provides means for error detection at the receiver. It is realized that the probability of an erroneous CRC condition (i.e., a CRC pass) after erroneous decoding of the associated data bits is typically small. Therefore, either UCI information, or information associated with the UCI information can be encoded and contained in the CRC. This avoids increasing the number of bits carrying the UCI compared to the traditional way of information encoding, wherein the CRC does not comprise any information.

According to a fourth aspect of the application, the above mentioned and other objectives are achieved with a base station in a wireless communication system, the base station comprising the baseband processor according to the third aspect.

The base station is also sometimes known as a (radio) network node or an access point.

The advantages of the base station according to the fourth aspect are the same as for the baseband processor according to the third aspect.

According to a fifth aspect of the application, the above mentioned and other objectives are achieved with a wireless communication system, comprising at least one of: the user device according to the second aspect and the base station according to the fourth aspect.

According to a sixth aspect of the application, the above mentioned and other objectives are achieved with a method in a wireless communication system, the method comprising:

generating a Cyclic Redundancy Check, CRC, code word based on at least one Hybrid Automatic Repeat Request-Acknowledgment, HARQ-ACK, feedback bit in response to a downlink carrier aggregation transmission;

jointly encoding at least one radio network parameter of the user device with the CRC code word;

generating an uplink control information message comprising the at least one HARQ-ACK feedback bit and the jointly encoded radio network parameter and CRC code word.

In a first possible implementation form of a method according to the sixth aspect, the radio network parameter indicates an identity of the user device.

In a second possible implementation form of a method according to the first possible implementation form of the sixth aspect or to the sixth aspect as such, the radio network parameter indicates one or more of: the number of the HARQ-ACK feedback bits and an arrangement of the at least one HARQ-ACK feedback bit in the control information message.

In a third possible implementation form of a method according to the second possible implementation form of the sixth aspect, the radio network parameter further indicates one or more of: a downlink carrier, a downlink carrier group, a subframe, and a transport block, for which the at least one HARQ-ACK feedback bit is transmitted.

In a fourth possible implementation form of a method according to the second possible implementation form of the sixth aspect, the radio network parameter is represented as a binary code word and wherein each bit in the binary code word indicates the one or more of: a downlink carrier, a downlink carrier group, a subframe, and a transport block, for which the at least one HARQ-ACK feedback bit is transmitted.

In a fifth possible implementation form of a method according to any of the second to fourth possible implementation forms of the sixth aspect, the radio network parameter further indicates an index value transmitted in a downlink control channel for determining the number of the HARQ-ACK feedback bits and the arrangement of the at least one HARQ-ACK feedback bit.

In a sixth possible implementation form of a method according to any of the preceding possible implementation forms of the sixth aspect or to the sixth aspect as such, the radio network parameter indicates a Scheduling Request, SR.

In a seventh possible implementation form of a method according to any of the preceding possible implementation forms of the sixth aspect or to the sixth aspect as such, the CRC code word comprises one or more CRC bits and the radio network parameter is represented as a binary code word, and the method further comprises:
jointly encoding the radio network parameter and the CRC code word by bit-wise addition of the one or more CRC bits with the binary code word.

In an eighth possible implementation form of a baseband processor according to the seventh possible implementation form of the sixth aspect, the radio network parameter is represented as a binary code word according to one of a block code and a non-linear code.

In a ninth possible implementation form of a method according to the eighth possible implementation form of the sixth aspect, the minimum Hamming distance between code words of the non-linear code is different for different binary code words.

In a tenth possible implementation form of the method according to the sixth aspect, the method further comprises:
transmitting the uplink control information message in an uplink channel.

According to a seventh aspect of the application, the above mentioned and other objectives are achieved with a method in a wireless communication system, the method comprising:

receiving an uplink control information message in an uplink channel, the uplink control information message comprising at least one HARQ-ACK feedback bit in response to a downlink carrier aggregation transmission and at least one jointly encoded radio network parameter and CRC code word for a user device, wherein the CRC code word is based on the at least one HARQ-ACK feedback bit; and
decoding the received uplink control information message and output the at least one HARQ-ACK feedback bit and the radio network parameter if a correct CRC condition is met.

The advantages of the methods according to the sixth and the seventh aspects are the same as those for the baseband processor according to the first and second aspects.

The present application also relates to a computer program, characterized in code means, which when run by processing means causes said processing means to execute any method according to the present application. Further, the application also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present application will be apparent from the following detailed description.

BRIEF DESCRIPTION OF THE DRAWINGS

The appended drawings are intended to clarify and explain different embodiments of the present application, in which.

DETAILED DESCRIPTION

Figure 1:
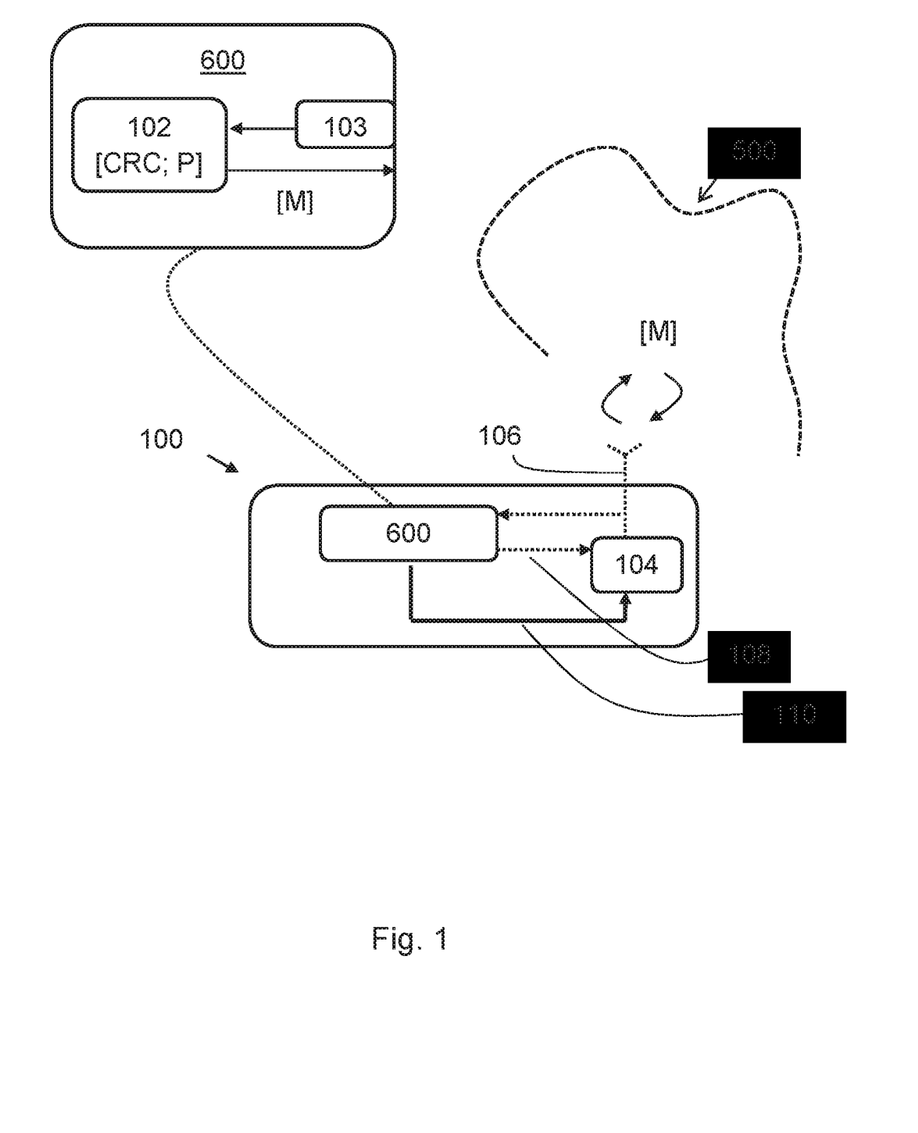
FIG. 1 shows a baseband processor and a user device according to an embodiment of the present application.

FIG. 1 shows a user device 100 according to an embodiment of the present application. The user device 100 comprises a baseband processor 600 located within the user device 100. The baseband processor 600 is also shown as an enlargement in FIG. 1 and comprises an encoder 102 communicably coupled with a receiver circuit 103. The receiver circuit 103 is configured to to receive a downlink carrier aggregation transmission, e.g., from a base station 300 (see FIG. 3).

According to the present solution, the encoder 102 of the baseband processor 600 is configured to generate a Cyclic Redundancy Check (CRC) code word based on at least one Hybrid Automatic Repeat Request-Acknowledgment, HARQ-ACK, feedback bit in response to the downlink carrier aggregation transmission. However, the CRC code word may also be generated based on further information entities, such as a SR bit, etc.

The encoder 102 is further configured to jointly encode at least one radio network parameter P of the user device 100 with the CRC code word. The encoder 102 is finally configured to generate an uplink control information message M comprising the at least one HARQ-ACK feedback bit and the jointly encoded radio network parameter and CRC code word.

As mentioned, the user device 100 comprises the baseband processor 600 which in turn is communicably coupled with communication means 108 to a transmitter circuit 104 in this exemplary embodiment. The communication means 108 are illustrated as a dotted arrow between the baseband processor 600 and the transmitter circuit 104 in FIG. 1. The communication means 108 are according to techniques well known in the art. The communication means 108 may, e.g., be used for transfer of data or signaling between the baseband processor 600 and the transmitter circuit 104. The user device 100 in this particular embodiment further comprises control means 110 by which the baseband processor 600 operates (or controls) the transmitter circuit 104. The control means are illustrated with the arrow from the baseband processor 600 to the transmitter circuit 104. The user device 100 also comprises antenna means 106 coupled to the transmitter circuit 104 for reception and transmission in the wireless communication system 500.

Figure 2:
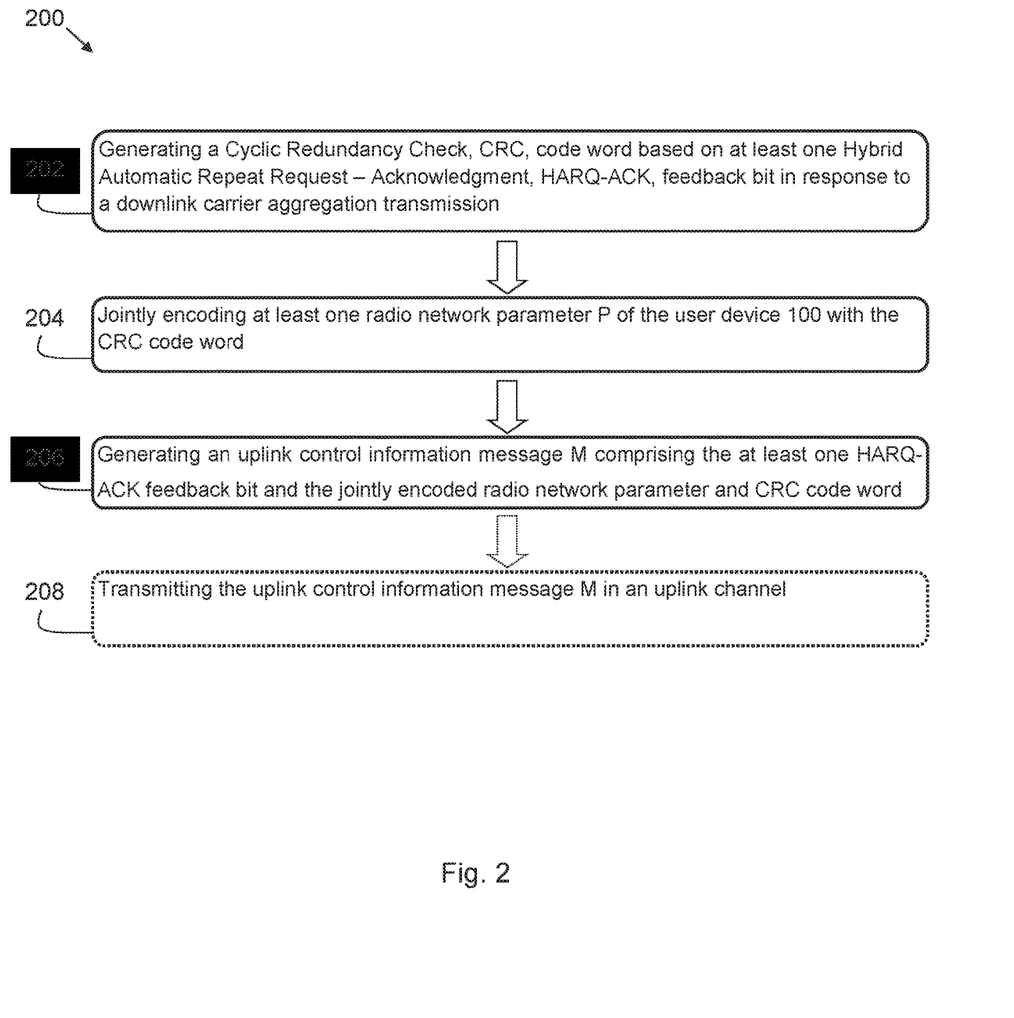
FIG. 2 shows a method according to an embodiment of the present application.

FIG. 2 shows a corresponding method 200. The method 200 may be executed in a baseband processor 600, such as the one shown in FIG. 1. The method 200 comprises the step 202 of generating a CRC code word based on at least one HARQ-ACK feedback bit in response to a downlink carrier aggregation transmission. The method 200 further comprises the step 204 of jointly encoding at least one radio network parameter P of the user device 100 with the CRC code word. The method 200 further comprises the step 206 of generating an uplink control information message M comprising the at least one HARQ-ACK feedback bit and the jointly encoded radio network parameter and CRC code word. The method 200 optionally comprises the step of transmitting the uplink control information message M in an uplink channel.

The user device 100 discussed in the present disclosure may be any of a User Equipment (UE), mobile station (MS), wireless terminal or mobile terminal is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Figure 3:
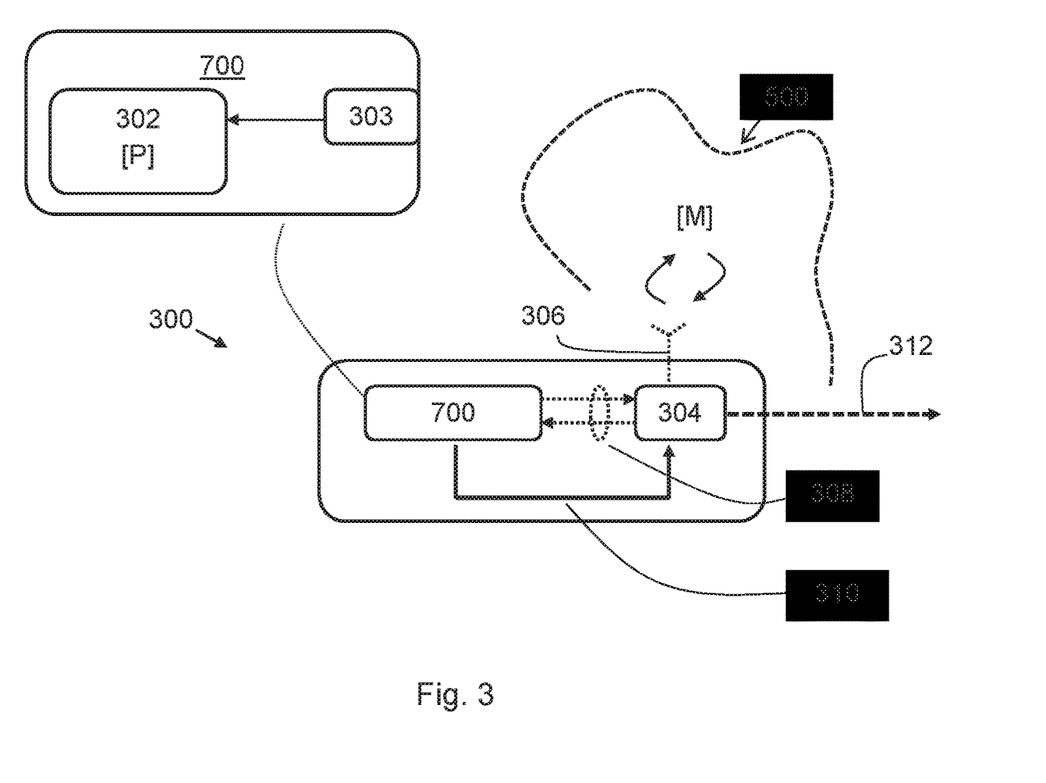
FIG. 3 shows a baseband processor and a base station according to an embodiment of the present application.

FIG. 3 shows a base station 300 according to an embodiment of the present application. The base station 300 comprises a baseband processor 700 located within the base station 300. The baseband processor 700 is also shown as an enlargement in FIG. 3 and comprises a decoder 302 communicably coupled with a receiver circuit 303.

According to the present solution the receiver circuit 303 is configured to receive an uplink control information message M in an uplink channel. The uplink control information message M comprises at least one HARQ-ACK feedback bit in response to a downlink carrier aggregation transmission and at least one jointly encoded radio network parameter and CRC code word for a user device 100. The CRC code word is based on the at least one HARQ-ACK feedback bit. The decoder 303 is configured to decode the received uplink control information message M and output the at least one HARQ-ACK feedback bit and the radio network parameter P if a correct CRC condition is met.

The baseband processor 700 of the base station 300 is communicably coupled with communication means 308 to a transceiver 304. The communication means 308 are illustrated as dotted arrows between the processor 302 and the transceiver 304 in FIG. 3. The communication means 308 are according to techniques well known in the art. The coupling means 308 may, e.g., be used for transfer of data or signaling between the processor 302 and the transceiver 304. The base station 300 in this particular embodiment further comprises control means 310 by which the processor 302 operates (or controls) the transceiver 304. The control means 310 are illustrated with the arrow from the processor 302 to the transceiver 304. The base station 300 also comprises antenna means 306 coupled to the transceiver 304 for reception and transmission in the wireless communication system 500. The base station 300 may also have wired communication means 312 so that the base station 300, e.g., can communication with other receiver devices, such as network nodes or control nodes, of the wireless communication system 500 over the wired communication means 312.

Figure 4:
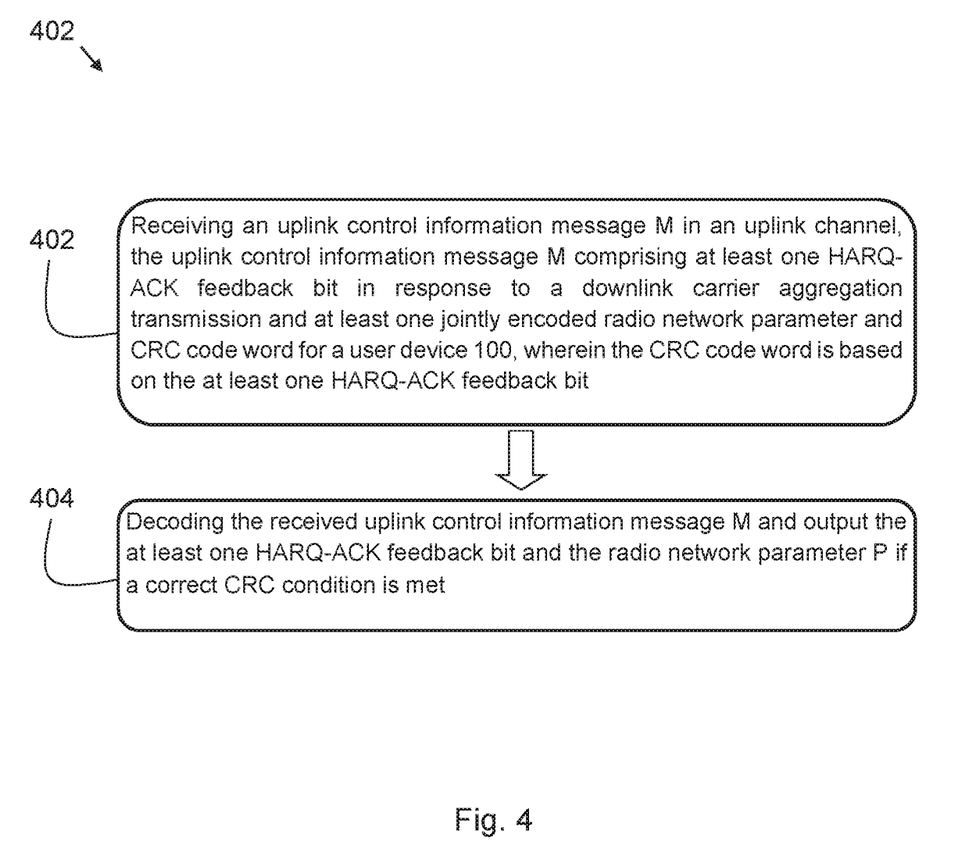
FIG. 4 shows a method according to an embodiment of the present application.

FIG. 4 shows a corresponding method 400. The method 400 may be executed in a base station 300, such as the one shown in FIG. 3. The method 400 comprises the step 402 of receiving an uplink control information message M in an uplink channel. The uplink control information message M comprising at least one HARQ-ACK feedback bit in response to a downlink carrier aggregation transmission and at least one jointly encoded radio network parameter and CRC code word for a user device 100. The CRC code word is based on the at least one HARQ-ACK feedback bit. The method 400 further comprises the step 404 of decoding the received uplink control information message M and output the at least one HARQ-ACK feedback bit and the radio network parameter P if a correct CRC condition is met.

The present base station 300 may be a (radio) network node or an access node or an access point or a base station, e.g., a Radio Base Station (RBS), which in some networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

Embodiments of the present application aim to improve the reliability of the UCI feedback by utilizing a CRC code word attached to information comprising at least one HARQ-ACK bit. However, the information may also comprise other information entities than the at least one HARQ-ACK bit.

A CRC provides means for error detection at the base station 300. It is realized that the probability of a decoding error of the CRC code (i.e., a CRC pass) after erroneous decoding of the associated data bits is typically small. Therefore, either UCI information, or information associated with the UCI information can be encoded and contained in the CRC code word. This avoids increasing the number of bits carrying the UCI compared to the traditional way of information encoding, wherein the CRC code word does not comprise any information.

The error detection probability of a CRC code depends on several factors, including the CRC code length, as well as the actual error pattern. However, the following properties of CRC error detection probabilities are known:

- A CRC code word of length L can detect all burst-error patterns of length L or less.
- A CRC code word of length L can detect the fraction $1-2^{1-L}$ of all burst-error patterns of length L+1.
- A CRC code word of length L can detect the fraction $1-2^{-L}$ of all burst-error patterns of length larger than L+1.

Encoding of information into a CRC code word will reduce its error detection probabilities. Therefore, the number of information entities which could be encoded by the CRC code word should be significantly less than $2^L$. For example, if L−1 bits are encoding information, it effectively leaves 1 bit for error detection.

According to an embodiment of the present application, the CRC code word comprises one or more CRC bits and the radio network parameter P is represented as a binary code word, and further the encoder 102 is configured to jointly encode the radio network parameter P and the CRC code word by bit-wise addition of the one or more CRC bits with the binary code word.

Figure 5:
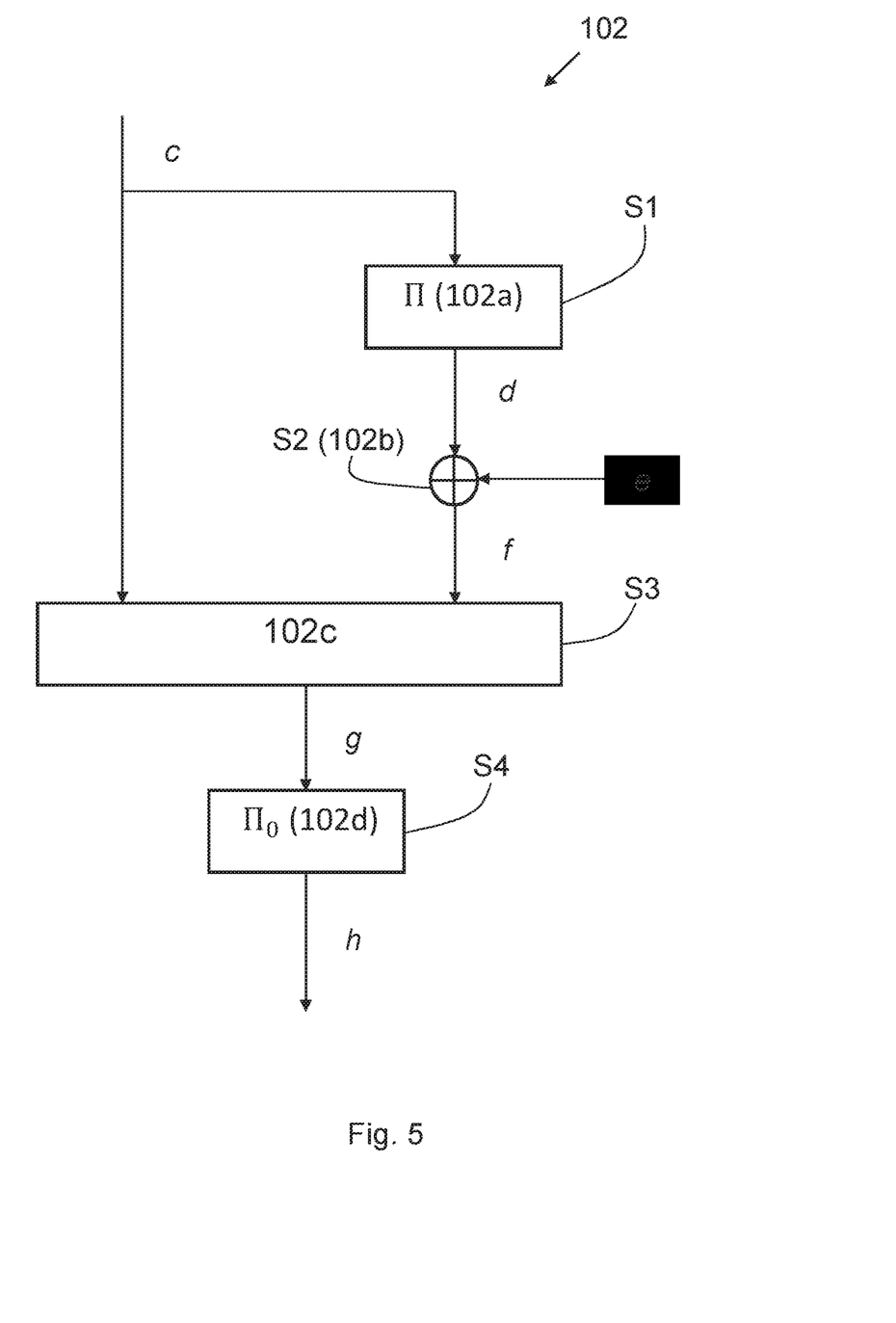
FIG. 5 show an embodiment of an encoder according to the present application.

FIG. 5 schematically shows an embodiment of an encoder 102 of the baseband processor 600. It should be noted that in the following disclosure embodiments and examples of the present solution are given in a LTE context. Therefore, LTE terminology and system concepts are used. It is however understood by the skilled person that the present solution is not limited to LTE systems and can be applied in any suitable wireless communication system, regardless of being cellular or not.

It should further be noted that the UE in the following disclosure corresponds to the user device 100 (e.g., the one shown in FIG. 1) whilst the eNodeB corresponds to the base station 300 (e.g., the one shown in FIG. 3). Also in the following examples the expression "first type of information" is used. The first type of information refers to at least HARQ-ACK bit but may also refer to further bits as explained above.

In the first step S1 in FIG. 5, the first type of information comprising N bits $c=[c_0, c_1, \ldots, c_{N-1}]$ is used to determine a set of L CRC bits $d=\pi(c)=[d_0, d_1, \ldots, d_{L-1}]$, where if denotes the operation of computing the CRC parity bits from the CRC polynomial in the CRC computing circuit 102a. The first type of information c comprises at least one HARQ-ACK bit and may, in some embodiments, additionally include other type of bits, such as a SR bit.

In the second step S2 in FIG. 5, the second type of information comprising at most L bits $e=[e_0, e_1, \ldots, e_L]$ is encoded by bit-wise addition in the adder circuit 102b with the CRC bits to produce the bits $f=[d_0 \oplus e_0, d_1 \oplus e_1, \ldots, d_{L-1} \oplus e_{L-1}]$ where $\oplus$ denotes modulo-2 addition. There can thus be less than $2^L$ information entities comprising the second type of information. Denote each such information entity by $e^{\{k\}}$, $k=0, 1, \ldots, K$ where $K \leq 2^L - 2$.

Figure 6:
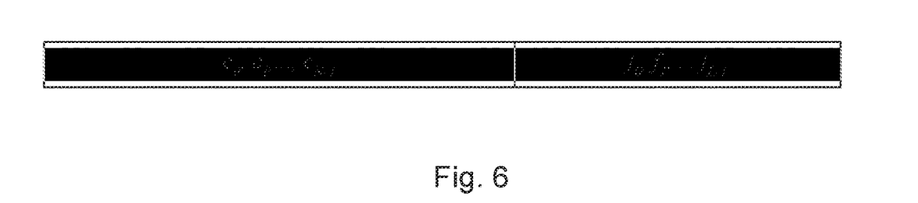
FIG. 6 shows an example of message comprising multiplexed c and f bits.

In the third step S3 in FIG. 5, the set of bits f are multiplexed in the multiplexer circuit 102c with the set of bits c to generate the set g of N+L bits. One embodiment of such attachment is a systematic operation by appending the bits such that g=[c, f], which is illustrated in FIG. 6. FIG. 6 shows an exemplary message with N multiplexed information bits c and L CRC bits f.

In the fourth step S4 in FIG. 5, the set of bits is encoded in the channel encoder circuit 102d into a set of M>N+L bits $h=\pi_0(g)=[h_0, h_1, \ldots, h_{M-1}]$, where $\pi_0$ denotes the operation of channel encoding. In one embodiment of the application, the channel encoding includes using a tailbiting convolutional code.

According to a further embodiment of the present application, the CRC code words can be represented as vectors $e^{(k)}$ according to a block code (n,k). This has the advantage of increasing the detection probability of the second type of information. Thus a block code of length n=L from which $2^k < 2^L$ codewords (i.e., vectors $e^{(k)}$) are used could apply. Examples of such block codes could be Reed-Muller codes. Such codes are linear, i.e., any codeword could be obtained by addition of other codewords and the complexity of encoding and decoding can be well-understood, for which efficient decoding algorithms can be deployed.

According to yet another embodiment of the present application, the CRC code words can be represented as vectors $e^{(k)}$ according to a non-linear code, wherein the application further discloses to determine the set of vectors such that the minimum Hamming distance is maximized. This may result in a non-linear code, i.e., a codeword cannot always be obtained by addition of other codewords. In the following, examples of such sets are given for L=8:

A Set of Two Codewords with Minimum Hamming Distance 8

$e^{(0)}=[0,0,0,0,0,0,0,0]$ $e^{(1)}=[1,1,1,1,1,1,1,1]$

A Set of Three Codewords with Minimum Hamming Distance 5

$e^{(0)}=[0,0,0,0,0,0,0,0]$ $e^{(1)}=[1,1,1,1,1,1,0,0]$ $e^{(2)}=[0,0,1,1,1,1,1,1]$

A Set of Four Codewords with Minimum Hamming Distance 5

$e^{(0)}=[0,0,0,0,0,0,0,0]$ $e^{(1)}=[0,1,1,0,1,1,0,1]$ $e^{(2)}=[1,0,1,1,0,1,1,0]$ $e^{(3)}=[1,1,0,1,1,0,1,1]$

According to this embodiment the minimum Hamming distance between code words of the non-linear code may be different for different binary code words.

An advantage of a non-linear code is that the codewords could be selected to maximize the minimum distance for a certain codeword to the other codewords. For the example of the set consisting of three codewords given above, the minimum distance between $e^{(1)}$ and $e^{(0)}$ is 6 and the minimum distance between $e^{(1)}$ and $e^{(2)}$ is 4. On the other hand, the minimum distance between $e^{(0)}$ and $e^{(2)}$ is 6. Thus, $e^{(0)}$ has two neighboring codewords at distance 6 and the error probability would be smaller than for $e^{(1)}$ or $e^{(2)}$. Thus, this set of codewords is beneficial if the a priori probability of $e^{(0)}$ is larger than for $e^{(1)}$ or $e^{(2)}$. Hence, an advantage of non-linear codes is that the codewords could be chosen to reduce the error probability considering that the second type of information may appear with unequal probabilities.

In the following, different embodiments related to the radio network parameter P are given for the present solution.

One objective of the present solution is to reduce the HARQ-ACK payload and only feedback ACK or NACK for carriers where the UE was scheduled. Removing redundant HARQ-ACK bits results in transmitting the HARQ-ACK at an effective lower code rate, which improves the reliability of the HARQ-ACK. Alternatively, less time-frequency resources may be required, which improves the spectral efficiency of the system. This requires the eNodeB to dynamically signal, e.g., in the PDCCH/EPDCCH, information to the UE such that the number of HARQ-ACK bits can be adapted dynamically. The information should make it possible to determine:

The number of HARQ-ACK bits to be transmitted.

The arrangement of the HARQ-ACK bits to be transmitted.

The term arrangement includes determining the relation between the bits in $c=[c_0, c_1, \ldots, c_{N-1}]$ and the HARQ-ACK bits for the different carriers and subframes. The main problem with dynamic signaling (as opposed to the currently used RRC signaling) is the unreliability of detecting such signaling.

If the UE and the eNodeB do not have the same understanding on the number of and arrangement of the HARQ-ACK bits (e.g., they assume different lengths of the vector c, or different relation between the HARQ-ACK bits and the elements in c), several error cases could occur:

The CRC will not pass and the eNodeB will have to treat all HARQ-ACK bits as NACK. This will imply large amounts of unnecessary retransmissions.

The CRC will pass but the eNodeB has another assumption on number of or the order of the HARQ-ACK bits than what the UE used. This may lead to NACK-to-ACK errors, which may cause HARQ-ACK buffer corruption in the UE, since it is expecting a retransmission but the eNodeB may initialize transmission of new data. It may also lead to ACK-to-NACK errors, which may cause the eNodeB to perform an unnecessary retransmission.

In the present solution it is realized that the problem of unreliable HARQ-ACK decoding can be mitigated if the UE not only feeds back the HARQ-ACK bits, but also information about which carriers and/or subframes for which it provides the HARQ-ACK bits. Thereby, the eNodeB could determine whether the number of and arrangement of the HARQ-ACK bits transmitted by the UE are the same as signaled by the eNodeB. Therefore, if after decoding the CRC passes, the eNodeB could confirm that the UE has the same understanding of the HARQ-ACK bits, which increases the reliability of the signaling. Likewise, if the CRC fails, the eNodeB could avoid detecting HARQ-ACK information where the UE has used another assumption on number and arrangement of the bits. Hence, it is an objective to reduce the probability that the CRC will pass when the eNodeB has decoded the bits c under a different assumption (e.g., length of c and order of elements in c) than what was assumed when encoded by the UE.

In the following disclosure, several embodiments are given of the radio network parameter P which can reduce the error cases.

Explicit Indication of Carriers, Carrier Groups or Transport Blocks

Up to L−1 bits (or L bits corresponding to less than $2^L$ information states) in $e=[e_0, e_1, \ldots, e_{L-1}]$ can indicate the signaling of HARQ-ACK on a carrier. The value L could be fixed (e.g., L=32) and be related to the maximum number of carriers the UE is capable of aggregating. For example $e_i=1$ if the UE has fed back HARQ-ACK for carrier i (i.e., decoded a PDSCH for the carrier) and $e_i=0$ if the UE has not fed back HARQ-ACK for carrier i, or if carrier i was not configured for carrier aggregation for the UE. Alternatively, the indexing $e_i$ in the set of L bits could also denote the i:th configured carrier for the UE. In this case, the value L is equal to the number of configured carriers, which may be smaller than the maximum number of carriers the UE is capable of aggregating. The implication of $e_i=1$ could include where the UE has fed back at least one HARQ-ACK bit for at least one subframe for carrier i, i.e., if multiple TBs can be transmitted per carrier per subframe, the UE decoded at least one TB in at least one subframe.

Each of up to L−1 bits (or L bits corresponding to less than $2^L$ information states) $e=[e_0, e_1, \ldots, e_{L-1}]$ can indicate the signaling of HARQ-ACK on a carrier or on a group of carriers. For example $e_i=1$ if the UE has fed back HARQ-ACK for carrier group i and $e_i=0$ if the UE has not fed back HARQ-ACK for carrier group i, or if carrier group i was not configured for carrier aggregation for the UE. The implication of $e_i=1$ could include where the UE has fed back at least one HARQ-ACK bit for at least one subframe for a carrier in carrier group i. The indexing $e_i$ in the set of L bits could also denote the i:th configured carrier group for the UE. The carriers belonging to carrier group i could either be predefined or be configured by higher-layer signaling.

Each of up to L−1 bits (or L bits corresponding to less than $2^L$ information states) $e=[e_0, e_1, \ldots, e_{L-1}]$ can indicate the signaling of HARQ-ACK in response to a Transport Block (TB) sent on a carrier. For example $e_i=1$ if the UE has fed back HARQ-ACK for TB i, where an enumeration is defined from the index i to a TB on subframe on a carrier and subframe. A carrier may include the transmission of two TBs and thus there may be two elements $e_i$ and $e_j$ which refer to two different HARQ-ACKs on one carrier either in the same subframe or in different subframes. An enumeration could be in an increasing order of carrier index an increasing order of TB index and an increasing order of the subframe number.

It is realized that the above examples could be combined with additional rules, e.g., the UE always feeds back HARQ-ACK for the PCell, while e only comprises information of the HARQ-ACKs related to the SCells.

It is realized that for the above examples, the usage of "subframe" may be disregarded for Frequency Division Duplex (FDD), since each UL subframe is associated with only one DL subframe. However, for Time Division Duplex (TDD), the usage of subframe may be needed, since an UL subframe may be associated with more than one DL subframe.

Downlink Control Channel Information

The eNodeB may provide signaling in the downlink control channel (e.g., PDCCH/EPDCCH) which the UE utilizes to determine the number of and arrangement of the HARQ-ACK bits to be transmitted. Such information may be given by some form of DAI bits or some newly defined bits for this purpose. These bits can represent an index value, e.g., 2 bits could be associated with 4 index values. Thus if k bits in the downlink control channel are used to provide such information, K vectors $e^{(k)}$, k=0, 1, . . . K−1, can be defined, each vector corresponding to one state of the k bits.

The UE may additionally utilize downlink control signaling in conjunction with higher layer signaling or predefined rules to determine the number of and arrangement of the HARQ-ACK bits. For example, an information entity signaled by the downlink control channel may be associated with one or several higher layer configured parameters or states, from which the UE can determine the number of and arrangement of the HARQ-ACK bits. For example, k bits in the downlink control channel could be used to identify any of $2^k$ states, where each state could correspond to a higher layer configuration of the number of and arrangement of HARQ-ACK bits.

One example is that the UE feeds back the DL control channel information bits (or an index) it has been using for adapting the HARQ-ACK payload. This makes it possible for the eNodeB to verify whether the UE has been following the arrangement signaled through the downlink control channel. Another example is that the UE feeds back information to the eNodeB regarding which higher layer state it used for determining the number of and arrangement of the HARQ-ACK bits. Such information may be an enumeration of the different higher layer states. For example, the base station could pre-determine or configure by higher-layer signaling, a set of HARQ-ACK states and an index is transmitted from the base station to the UE for indicating a selection of HARQ-ACK state. The HARQ-ACK state would at least comprise the number of HARQ-ACK bits and the arrangement of the HARQ-ACK bits which the UE should assume.

For the above embodiments, it could be envisaged that some states of the radio network parameter P would occur more often than others. For example, it is likely that a UE is typically scheduled on a few downlink carriers than large number of downlink carriers. Hence, the encoding method discussed previously which utilizes non-linear encoding, could assign codewords with large minimum Hamming distance to states of the second information which would be more frequently used. Therefore, the minimum Hamming distance between code words of the non-linear code is different for different binary code words.

UE Identity

Each UE in a cell is configured with one or several identities used in the physical layer processing. In LTE and LTE-Advanced they are being referred to as Radio Network Temporary Identifiers (RNTIs). Such an RNTI has a length of 16 bits. If the CRC length L=16, it would therefore be possible to encode the user identity on the CRC of every UE. An advantage of encoding the UE identity is that, in case of false downlink control channel detection, which results in a non-valid transmission of HARQ-ACK feedback with the state NACK, the eNodeB could identify whether the decoded uplink control channel (e.g., PUCCH) is from a desired UE or from a UE which erroneously transmitted the uplink control channel. This improves the reliability of the UCI feedback for cases where there is unplanned intra-cell interference due to PUCCH collisions, i.e., the case where multiple UEs transmit information on the same time/frequency/code resource. Also, the C-RNTI can be used as the UE identity.

In the base station 300, i.e., the eNodeB, it would suffice to only detect the UE identity of the desired UE, since it is only the transmission from the desired UE that contains useful HARQ-ACK information. Hence, the detection complexity could be reduced and there would be no impact to detection performance, since the number of detection hypotheses (i.e., the number of decoded second type information vectors $e_i^{(k)}$) is 1. Therefore, the radio network parameter P indicates an identity of the user device 100.

Scheduling Request

If the subframe is configured for SR transmission, a single request bit can be appended to the HARQ-ACK bits to indicate a negative or positive SR. However, it is realized that adding the SR bit impacts the HARQ-ACK decoding performance negatively since it increases the code rate. The SR bit can therefore be encoded using two states $e^{\{0\}}$ and $e^{\{1\}}$ on the CRC. The corresponding bits [$e_0, e_1, \ldots, e_{L-1}$] can be chosen to maximize the Hamming distance between $e^{\{0\}}$ and $e^{\{0\}}$. For example, a Hamming distance of L can be obtained if $e^{\{0\}}=[0, 0, \ldots, 0]$ and $e^{\{1\}}=[1, 1, \ldots, 1]$. Therefore, the radio network parameter P indicates a SR. In this case, the CRC is not calculated on the SR bit through the vector c.

It is noted that all the above embodiments of the radio network parameter P can be combined such that multiple types of radio network parameters P could be encoded, conditioned on that the number of information entities is smaller than $2^L$ according to an embodiment.

Figure 7:
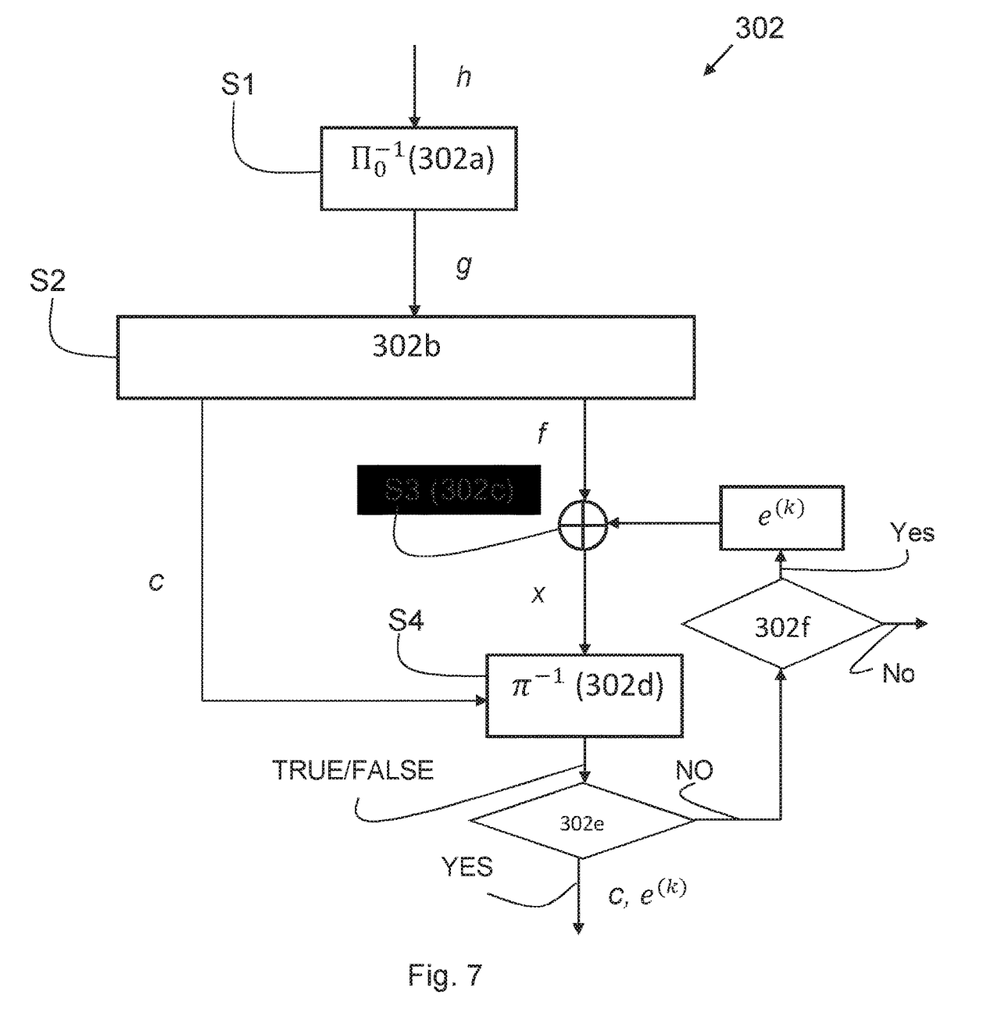
FIG. 7 shows an embodiment of a decoder according to the present application.

FIG. 7 shows a decoder 302 of a base station 300 according to an embodiment of the present application.

In the first step S1 in FIG. 7, the set of coded bits h is decoded to produce the set of N+L bits $g=\pi_0^{-1}(h)$ at the channel decoding circuit 302a, where $\pi_0^{-1}$ denotes the operation of channel decoding. The input h may comprise binary bit values, soft bit values, log-likelihood ratios, or the like.

In the second step S2 in FIG. 7, de-multiplexing of the bits in g is performed in the de-multiplexer circuit 302b to produce the bits c and f, respectively.

In the third step S3 in FIG. 7, the decoder 302 produces (for a candidate second information vector $e_i^{(k)}$) with the adder circuit 302c a new set of bits $x=[x_0, x_1, \ldots, x_{L-1}]$ where $x_i=f_i \oplus e_i^{(k)}$. The set of candidate second information vectors could comprise all or a subset of the information vectors $e^{(k)}$.

In the fourth step S4 in FIG. 7, it is checked whether the CRC check $\pi^{-1}(x,c)$ is successful=TRUE or unsuccessful=FALSE.

If the decoding is successful at the CRC check circuit 302d, the second type of information is $e^{(k)}$ and the first type of information is c and both first and second types of information are outputted at the circuit 302e (YES at circuit 302e).

If the CRC is unsuccessful at the CRC check circuit 302d, the third step S3 and the fourth step S4 in FIG. 7 are repeated (NO at circuit 302e) with a new index k until all candidates have been tested or the CRC is successful at the CRC check circuit 302d. Therefore, at circuit 302f it is checked if a new index k remains. If a new index k remains=YES steps S3 and S4 are repeated, otherwise if a new index k remains=NO, a decoding error is declared at circuit 302f.

An advantage of this method is that the first step S1 in FIG. 7 only needs to be performed once, which reduces the complexity of the decoder 302. Typically, the decoding $\pi_0^{-1}$ is more complex than the CRC check $\pi^{-1}$.

Figure 8:
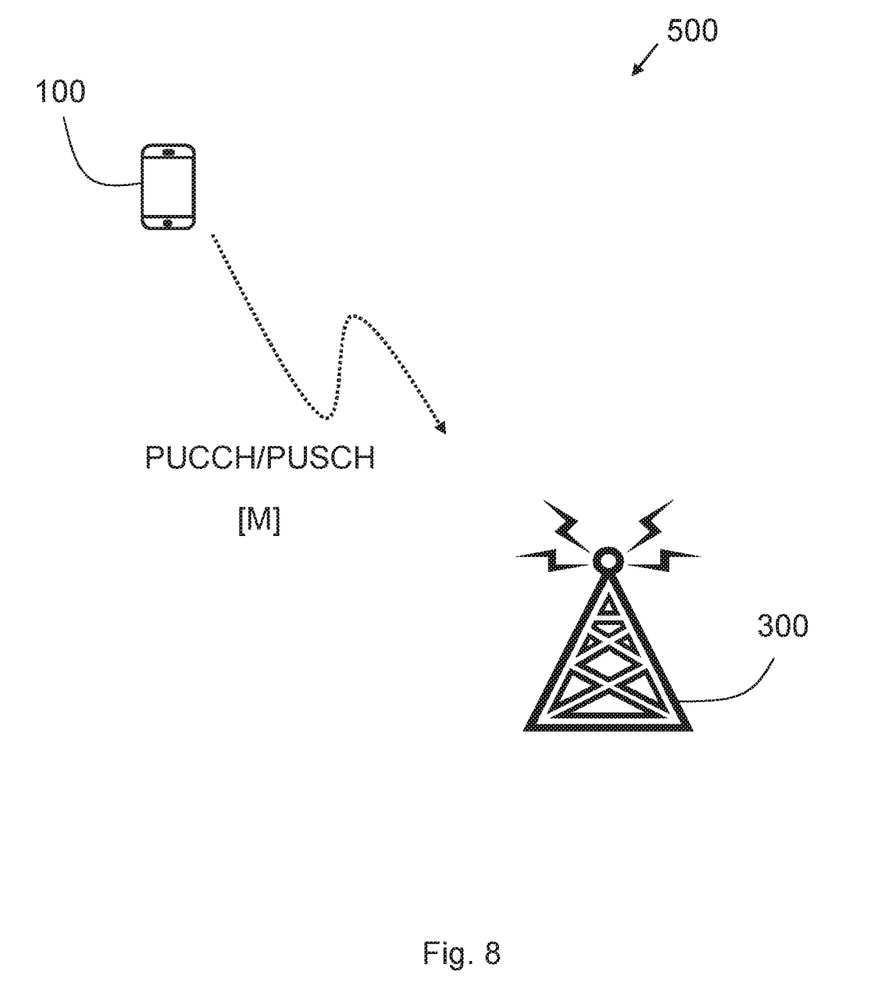
FIG. 8 shows a wireless communication system according to an embodiment of the present application.

FIG. 8 shows a wireless communication system 500 according to an embodiment of the present application. The wireless communication system 500 comprises at least one user device 100 or at least one base station 300 according to the present solution. It is illustrated in FIG. 8 how the user device 100 transmits an uplink control information message in an uplink channel to the base station 300. The uplink channel may according to an embodiment of the present application be PUCCH or PUSCH as shown in FIG. 8.

Furthermore, any method according to the present application may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present user device and base station comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present user device and base station may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present application is not limited to the embodiments described above, but also relates to and incorporates all embodiments within the scope of the appended independent claims.

What is claimed is:

1. A baseband processor, comprising:
    a receiver circuit configured to receive a downlink carrier aggregation transmission; and
    an encoder coupled to the receiver circuit and configured to:
        generate a cyclic redundancy check (CRC) code word based on at least one Hybrid Automatic Repeat Request-Acknowledgment (HARQ-ACK) feedback bit in response to the downlink carrier aggregation transmission,
        jointly encode at least one radio network parameter (P) of a user device—with the CRC code word, and
        generate an uplink control information message (M) comprising the at least one HARQ-ACK feedback bit and the radio network parameter and CRC code word.

2. The baseband processor according to claim 1, wherein the radio network parameter (P) indicates an identity of the user device.

3. The baseband processor according to claim 1, wherein the radio network parameter (P) indicates one or more of: a number of HARQ-ACK feedback bits or an arrangement of the at least one HARQ-ACK feedback bit in the uplink control information message (M).

4. The baseband processor according to claim 3, wherein the radio network parameter (P) further indicates one or more of: a downlink carrier, a downlink carrier group, a subframe, or a transport block for which the at least one HARQ-ACK feedback bit is transmitted.

5. The baseband processor according to claim 4, wherein the radio network parameter (P) is represented as a binary code word, and wherein each bit in the binary code word indicates one or more of: a downlink carrier, a downlink carrier group, a subframe, or a transport block for which the at least one HARQ-ACK feedback bit is transmitted.

6. The baseband processor according to claim 3, wherein the radio network parameter (P) further indicates an index value transmitted in a downlink control channel for determining the number of the HARQ-ACK feedback bits and the arrangement of the at least one HARQ-ACK feedback bit.

7. The baseband processor according to claim 1, wherein the radio network parameter (P) indicates a Scheduling Request (SR).

8. The baseband processor according to claim 1, wherein the CRC code word comprises one or more CRC bits, wherein the radio network parameter (P) is represented as a binary code word, and wherein the encoder is further configured to jointly encode the radio network parameter (P) and the CRC code word by bit-wise addition of the one or more CRC bits with the binary code word.

9. The baseband processor according to claim 8, wherein the radio network parameter (P) is represented as a binary code word according to one of a block code or a non-linear code.

10. The baseband processor according to claim 9, wherein a minimum Hamming distance between code words of the non-linear code is different for different binary code words.

11. A baseband processor, comprising:
    a receiver circuit configured to receive an uplink control information message (M) in an uplink channel, wherein the uplink control information message (M) comprises at least one Hybrid Automatic Repeat Request Acknowledgment (HARQ-ACK) feedback bit in response to a downlink carrier aggregation transmission and at least one jointly encoded radio network parameter and cyclic redundancy check (CRC) code word for a user device, and wherein the CRC code word is based on the at least one HARQ-ACK feedback bit; and
    a decoder coupled to the receiver circuit and configured to decode the uplink control information message (M) and output the at least one HARQ-ACK feedback bit and the radio network parameter (P) when a correct CRC condition is met.

12. A method in a wireless communication system, the method comprising:

generating, by an encoder of a baseband processor, a cyclic redundancy check (CRC) code word based on at least one Hybrid Automatic Repeat Request-Acknowledgment (HARQ-ACK) feedback bit in response to a downlink carrier aggregation transmission;

jointly encoding, by the encoder, at least one radio network parameter (P) of the user device with the CRC code word; and generating, by the encoder, an uplink control information message (M) comprising the at least one HARQ-ACK feedback bit and the jointly encoded radio network parameter and CRC code word.

13. The method according to claim 12, wherein the radio network parameter (P) indicates an identity of the user device.

14. The method according to claim 12, wherein the radio network parameter (P) indicates one or more of: a number of the HARQ-ACK feedback bits or an arrangement of the at least one HARQ-ACK feedback bit in the control information message (M).

15. The method according to claim 14, wherein the radio network parameter (P) further indicates one or more of: a downlink carrier, a downlink carrier group, a subframe, or a transport block for which the at least one HARQ-ACK feedback bit is transmitted.

16. The method according to claim 15, wherein the radio network parameter (P) is represented as a binary code word, and wherein each bit in the binary code word indicates one or more of: a downlink carrier, a downlink carrier group, a subframe, or a transport block for which the at least one HARQ-ACK feedback bit is transmitted.

17. The method according to claim 14, wherein the radio network parameter (P) further indicates an index value transmitted in a downlink control channel for determining the number of the HARQ-ACK feedback bits and the arrangement of the at least one HARQ-ACK feedback bit.

18. The method according to claim 12, wherein the radio network parameter (P) indicates a Scheduling Request (SR).

19. The method according to claim 12, wherein the CRC code word comprises one or more CRC bits, wherein and the radio network parameter (P) is represented as a binary code word, and wherein the method further comprises jointly encoding the radio network parameter (P) and the CRC code word by bit-wise addition of the one or more CRC bits with the binary code word.

20. A method in a wireless communication system, the method comprising:

receiving, by a receiver circuit of a baseband processor, an uplink control information message (M) in an uplink channel, wherein the uplink control information message (M) comprises at least one Hybrid Automatic Repeat Request-Acknowledgment (HARQ-ACK) feedback bit in response to a downlink carrier aggregation transmission and at least one jointly encoded radio network parameter and cycle redundancy check (CRC) code word for a user device, and wherein the CRC code word is based on the at least one HARQ-ACK feedback bit; and decoding, by a decoder of the baseband processor, the uplink control information message (M) and outputting the at least one HARQ-ACK feedback bit and the radio network parameter (P) when a correct CRC condition is met.

* * * * *